E. S. ALLEN.
VALVE FOR GAS BURNERS.
APPLICATION FILED OCT. 26, 1912.

1,091,108.

Patented Mar. 24, 1914.

WITNESSES

INVENTOR
Eugene S. Allen
BY
ATTORNEYS

UNITED STATES PATENT OFFICE.

EUGENE S. ALLEN, OF NEW YORK, N. Y.

VALVE FOR GAS-BURNERS.

1,091,108.  Specification of Letters Patent.  Patented Mar. 24, 1914.

Application filed October 26, 1912. Serial No. 727,865.

*To all whom it may concern:*

Be it known that I, EUGENE S. ALLEN, a citizen of the United States, and a resident of the city of New York, borough of Manhattan, in the county and State of New York, have invented a new and Improved Valve for Gas-Burners, of which the following is a full, clear, and exact description.

The invention relates to gas burners such as are used in stoves for heating and cooking purposes, and the object is to provide a new and improved valve for gas burners arranged to permit convenient adjusting with a view to regulate the amount of gas passing from the service pipe to the burner and to be automatically closed by a movable member of a stove so that the gas is shut off from the burner.

For the purpose mentioned use is made of a valve body having a gas passage adapted to be connected at one end with a gas supply and at the other end with the burner, the body also having a conical seat intersecting the said passage, and the said seat is engaged by a conical sleeve having a diametrical opening in register with the gas passage, the sleeve also having a central bore intersecting the said opening, a cylindrical valve slidable in the bore of the sleeve and having an annular groove and a collar on the upper portion of the said valve and normally seated on the top of the said sleeve, a top cap screwing on the upper end of the said sleeve and through which extends the upper portion of the valve, a spring in the cap and bearing on the said collar, a nut screwing on the lower end of the valve and adapted to abut against the under side of the said sleeve to limit the upward sliding movement of the valve.

A practical embodiment of the invention is represented in the accompanying drawing forming a part of this specification, in which similar characters of reference indicate corresponding parts in all the views.

Figure 1:
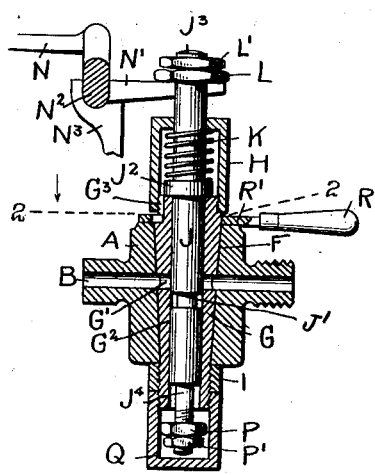
Figure 2:
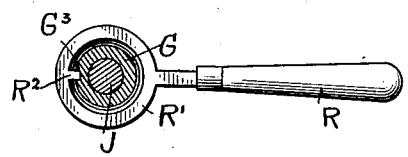

Figure 1 is a sectional side elevation of the valve; and Fig. 2 is a sectional plan view of the same on the line 2—2 of Fig. 1.

The valve body A is provided with a gas passage B adapted to be connected at one end with a gas supply pipe and at the other end with a burner. The body A is provided with a conical seat F intersecting the gas passage B and in the said seat F is seated a conical sleeve G provided with a diametrical opening G' in register with the gas passage B, as plainly indicated in Fig. 1. On the upper end of the sleeve G screws a cap H and on the lower end of the sleeve G screws a nut I abutting against the under side of the valve body A so that the sleeve G is securely fastened in position on the valve body A by the use of the nut I. The sleeve G is provided with a central bore $G^2$ in which is mounted to slide a cylindrical valve J provided with an annular groove J' normally out of register with the opening G' but adapted to move into register with the said opening to allow passage of the gas through the gas passage B from the supply pipe to the burner. The upper portion of the valve J is provided with a collar $J^2$ normally seated on the top of the sleeve G, that is, at the time the annular groove J' is below the opening G' and out of register with the same. On the collar $J^2$ rests one end of a spring K bearing with its other end against the under side of the cap H to normally hold the valve J in closed position. The upper portion of the valve J extends through the cap H and is provided on the threaded terminal $J^3$ with a nut L adapted to be locked in place by a jam nut L', and the under side of the nut L is engaged by the forked end N' of a lever N fulcrumed at $N^2$ on a bracket $N^3$. The free end of the lever N is adapted to extend into a stove so as to be engaged and operated by a movable part thereof.

In order to limit the upward movement of the valve J the lower reduced threaded portion $J^4$ thereof is provided with a nut P adapted to abut against the under side of the sleeve G to limit the upward movement of the valve J at the time the latter is raised by the action of the lever N. Now by adjusting the nut P on the threaded portion $J^4$ the groove J' may be moved into more or less register with the opening G' at the time the valve J is raised to its limit by the action of the lever N. A jam nut P' screws on the threaded portion $J^4$ against the nut P to lock the latter in the adjusted position. A cap Q is preferably screwed on the lower end of the sleeve G so as to inclose the nuts P, P' and the lower portion of the threaded end $J^4$ of the valve J to prevent unauthorized persons from tampering with the position of the nut P.

In order to permit the user of the gas stove to turn off the gas from the burner use is made of a handle R terminating in a ring R' encircling the sleeve G intermediate the body A and the lower end of the cap H, and the said ring R' is provided with a lug or key R² extending into a groove G³ formed on the sleeve G so that when the operator turns the handle R a turning motion is given to the sleeve G to move the opening G' out of register with the gas passage B to cut off the gas from the burner whenever it is desired to do so. Normally the sleeve G is in the position shown in Fig. 1 so that the opening G' is in register with the gas passage B.

It is understood that when the valve J is in lowermost position the gas supply to the burner is cut off and when the lever N is operated then the valve J is raised and the groove J' is moved into register with the opening G', as previously explained, to allow gas to flow from the supply pipe to the burner. By adjusting the nut P the amount of the upward movement of the valve J can be regulated so that the groove J' moves more or less in register with the opening G' to control the amount of the gas passing through the passage B at the time. By having the nut L adjustable on the upper threaded end J³ of the stem J the lever N can be placed in proper position relative to the movable member of the stove.

Having thus described my invention, I claim as new and desire to secure by Letters Patent:

1. A valve, comprising a valve body having a fluid passage, and a seat intersecting the said passage, an open ended sleeve mounted to turn in the seat and provided with openings adapted to register with the fluid passage of the body, a valve mounted to slide in the sleeve and having a passage adapted to register with the sleeve openings, said valve projecting beyond the ends of the sleeve and provided with stops for limiting the sliding movement thereof, a spring for holding the valve with its passage out of register with the sleeve openings, means for sliding the valve to bring its passage in register with the openings of the sleeve, and means for turning the sleeve to bring its openings in and out of register with the fluid passage of the body.

2. A valve comprising a valve body having a fluid passage and a conical seat intersecting the passage, an open ended conical sleeve in the seat and having its lower end screw threaded and projecting through the body, the sleeve being provided with openings registering with the fluid passage of the body, a nut on the lower end of the sleeve, a cylindrical valve mounted to slide in the sleeve and having an annular groove adapted to register with the sleeve openings, said valve projecting beyond the ends of the sleeve and provided with stops for limiting the sliding movement thereof, a spring engaging one of the said stops for holding the valve with its groove out of register with the sleeve openings, and means for sliding the valve to bring its groove in register with the openings of the sleeve.

3. A valve, comprising a valve body having a fluid passage and a conical seat intersecting said passage, a conical sleeve in the seat and having its lower end screw threaded and projecting through the valve body, the sleeve being provided with openings registering with the fluid passage of the body, a nut on the lower end of the sleeve, a cylindrical valve in the sleeve and having its lower end screw threaded and projecting through said sleeve, the valve being provided with an annular groove adapted to register with the sleeve openings, nuts on the lower end of the valve, and a spring for holding the valve with its groove out of register with the sleeve openings.

4. A valve, comprising a valve body having a gas passage and a conical seat intersecting the said passage, a sleeve fitting into the said seat and having a diametrical opening in register with the gas passage and having a central bore intersecting the said opening, a cylindrical valve slidable in the bore of the sleeve and having an annular groove adapted to register with the said sleeve opening, a collar on the upper portion of the said valve and normally seated on the top of the said sleeve, a top cap screwing on the upper end of the said sleeve and through which extends the upper end of the said valve, a spring in the cap and bearing on the said collar, nuts screwing on the lower end of the valve and adapted to abut against the lower end of the said sleeve, and a bottom cap screwing on the lower end of the sleeve and abutting against the under side of the said valve body, the said bottom cap inclosing the said reduced end of the valve and the nuts screwing on the said lower valve end.

5. In a gas stove, a valve comprising a valve body provided with a gas passage, and a conical seat intersecting the said gas passage, a conical sleeve seated on the said seat and having a diametrical opening and a central bore intersecting the said opening, the latter registering with the said gas passage, a cylindrical valve slidable in the bore of the said sleeve and having an annular groove normally out of register with the said sleeve opening, means for operating the valve to move it into open position, a spring pressing the said valve to normally hold the valve in closed position, means to limit the sliding movement of the valve in the sleeve, and a handle connected with the said sleeve for turning the latter to move the sleeve opening into or out of register with the said gas passage in the valve body.

6. A valve comprising a valve body having a gas passage and a conical seat, a conical sleeve mounted to turn in the said seat and having each end projecting beyond the valve body, said sleeve having its ends threaded and provided with openings adapted to register with the gas passage, caps screwing on the ends of the sleeve, the upper cap being apertured, a cylindrical valve in the sleeve and projecting through the upper cap, the valve having its lower end threaded and provided with a collar adapted to rest on the sleeve and with an annular groove adapted to register with the openings of said sleeve, a nut on the lower threaded end of the valve within the lower cap, a spring surrounding the valve in the upper cap above the collar, and a handle having a ring surrounding the upper end of the sleeve and secured thereto between the lower end of the cap and the valve body.

In testimony whereof I have signed my name to this specification in the presence of two subscribing witnesses.

EUGENE S. ALLEN.

Witnesses:
 THEO. G. HOSTER, Jr.,
 PHILIP D. ROLLHAUS.

Copies of this patent may be obtained for five cents each, by addressing the "Commissioner of Patents, Washington, D. C."